(12) United States Patent
Imazu

(10) Patent No.: US 11,834,036 B2
(45) Date of Patent: Dec. 5, 2023

(54) AUTOMATED VALET PARKING SERVER, AUTONOMOUS DRIVING VEHICLE, AUTOMATED VALET PARKING SYSTEM

(71) Applicant: TOYOTA JIDOSHA KABUSHIKI KAISHA, Toyota (JP)

(72) Inventor: Takanori Imazu, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/662,769

(22) Filed: May 10, 2022

(65) Prior Publication Data

US 2022/0363245 A1 Nov. 17, 2022

(30) Foreign Application Priority Data

May 14, 2021 (JP) .................................. 2021-082373

(51) Int. Cl.
| | |
|---|---|
| *B60W 30/06* | (2006.01) |
| *G06V 10/60* | (2022.01) |
| *G06V 20/54* | (2022.01) |
| *G06V 20/56* | (2022.01) |
| *B60Q 1/50* | (2006.01) |
| *B60Q 1/48* | (2006.01) |

(52) U.S. Cl.
CPC .............. *B60W 30/06* (2013.01); *B60Q 1/48* (2013.01); *B60Q 1/507* (2022.05); *G06V 10/60* (2022.01); *G06V 20/54* (2022.01); *G06V 20/56* (2022.01); *B60W 2556/40* (2020.02); *G06V 2201/08* (2022.01)

(58) Field of Classification Search
CPC ....... B60W 30/06; G06V 10/60; G06V 20/54; G06V 20/56; B60Q 1/507; B60Q 1/48
USPC ........................................................ 340/932.2
See application file for complete search history.

(56) References Cited

U.S. PATENT DOCUMENTS

| | | | |
|---|---|---|---|
| 2018/0307919 A1* | 10/2018 | Hayakawa | ........... G06V 20/588 |
| 2020/0128082 A1* | 4/2020 | Azuma | .................... G06F 9/526 |
| 2020/0265605 A1* | 8/2020 | Kaneko | ..................... G06T 7/73 |

(Continued)

FOREIGN PATENT DOCUMENTS

| | | |
|---|---|---|
| DE | 102017011762 A1 | 7/2018 |
| JP | 2019-098911 A | 6/2019 |

(Continued)

*Primary Examiner* — Kerri L McNally
(74) *Attorney, Agent, or Firm* — Dickinson Wright, PLLC

(57) ABSTRACT

There is provided an automated valet parking server that causes an autonomous driving vehicle in a parking place to perform automated valet parking by instructing the autonomous driving vehicle. The automated valet parking server includes an illuminance information acquisition unit configured to acquire illuminance information of front lighting devices of the autonomous driving vehicle, an illuminance suppression point setting unit configured to set an illuminance suppression point which is a position in the parking place at which illuminance of the front lighting devices of the autonomous driving vehicle is suppressed based on parking place map information of the parking place and the illuminance information of the front lighting devices of the autonomous driving vehicle, and an illuminance suppression instruction unit configured to instruct the autonomous driving vehicle to perform illuminance suppression at the illuminance suppression point.

8 Claims, 9 Drawing Sheets

(56) References Cited

U.S. PATENT DOCUMENTS

| | | | |
|---|---|---|---|
| 2020/0361451 A1* | 11/2020 | Noguchi | G08G 1/146 |
| 2021/0061264 A1* | 3/2021 | Stefan | B60W 30/06 |
| 2021/0197801 A1* | 7/2021 | Oh | G05D 1/0214 |
| 2021/0248386 A1* | 8/2021 | Takato | G08G 1/146 |
| 2022/0207277 A1* | 6/2022 | Ip | G06V 10/82 |

FOREIGN PATENT DOCUMENTS

| | | |
|---|---|---|
| JP | 2020-045045 A | 3/2020 |
| JP | 2020166419 A | 10/2020 |

\* cited by examiner

AUTOMATED VALET PARKING SERVER, AUTONOMOUS DRIVING VEHICLE, AUTOMATED VALET PARKING SYSTEM

CROSS-REFERENCE TO RELATED APPLICATION

This application claims the benefit of priority from Japanese Patent Application No. 2021-082373, filed May 14, 2021, the entire contents of which are incorporated herein by reference.

TECHNICAL FIELD

The present disclosure relates to an automated valet parking server, an autonomous driving vehicle, and an automated valet parking system.

BACKGROUND

In the related art, Japanese Unexamined Patent Publication No. 2019-098911 is known as a technical document relating to automated valet parking. This publication describes that a lighting device that illuminates an outside of a vehicle is turned on when illuminance outside the vehicle is equal to or less than a threshold value.

SUMMARY

However, the above-mentioned publication merely describes that the lighting device is turned on when the illuminance outside the vehicle is equal to or less than the threshold value. There is room for further improvement regarding the turning-on of lighting devices of a vehicle that perform automated valet parking.

One aspect of the present disclosure is an automated valet parking server that causes an autonomous driving vehicle in a parking place to perform automated valet parking by instructing the autonomous driving vehicle. The automated valet parking server includes an illuminance information acquisition unit configured to acquire illuminance information of front lighting devices of the autonomous driving vehicle, an illuminance suppression point setting unit configured to set an illuminance suppression point which is a position in the parking place at which illuminance of the front lighting devices of the autonomous driving vehicle is suppressed based on parking place map information of the parking place and the illuminance information of the front lighting devices of the autonomous driving vehicle, and an illuminance suppression instruction unit configured to instruct the autonomous driving vehicle to perform illuminance suppression at the illuminance suppression point.

In accordance with the automated valet parking server according to one aspect of the present disclosure, since the illuminance suppression point which is the position in the parking place at which the illuminance of the front lighting devices of the autonomous driving vehicle is suppressed is set based on the parking place map information of the parking place and the illuminance information of the front lighting devices of the autonomous driving vehicle and the instruction about the illuminance suppression at the illuminance suppression point is given to the autonomous driving vehicle, it is possible to reduce the hindrance the recognition of the autonomous driving vehicle or improper influence on surroundings by the illuminance of the front lighting devices.

In the automated valet parking server according to one aspect of the present disclosure, the illuminance suppression point setting unit may be configured to set the illuminance suppression point at a position corresponding to a landmark for host vehicle position estimation of the autonomous driving vehicle, which is provided in the parking place, based on the parking place map information, the illuminance information of the front lighting devices of the autonomous driving vehicle, and parking place lighting information associated with the parking place map information.

In the automated valet parking server according to one aspect of the present disclosure, the information on illuminance in the parking place corresponding to a time zone may be included in the parking place lighting information, and the illuminance suppression point setting unit may be configured to set the illuminance suppression point based on information on illuminance in the parking place corresponding to a current time.

In the automated valet parking server according to one aspect of the present disclosure, the illuminance information acquisition unit may be configured to acquire the illuminance information by measuring the illuminance of the front lighting devices of the autonomous driving vehicle by an illuminance measurement device provided in the parking place.

In the automated valet parking server according to one aspect of the present disclosure, the illuminance information acquisition unit may be configured to acquire the illuminance information from image information captured by a front camera of the autonomous driving vehicle when the front lighting devices of the autonomous driving vehicle are turned on.

Another aspect of the present disclosure is an autonomous driving vehicle that receives an instruction related to automated valet parking from the automated valet parking server. The autonomous driving vehicle includes a host vehicle position recognition unit configured to recognize a host vehicle position in the parking place, a determination unit configured to determine whether or not the autonomous driving vehicle reaches the illuminance suppression point based on the host vehicle position recognized by the host vehicle position recognition unit and the illuminance suppression point as instructed from the automated valet parking server, and a lighting device controller configured to, when the determination unit determines that the autonomous driving vehicle reaches the illuminance suppression point, turn off a part or all of the front lighting devices.

In accordance with the autonomous driving vehicle according to another aspect of the present disclosure, when the autonomous driving vehicle reaches the illuminance suppression point as instructed from the automated valet parking server, since a part or all of the front lighting devices is turned off, it is possible to reduce the hindrance the recognition of an external environment of the autonomous driving vehicle or improper influence on surroundings by the illuminance of the front lighting devices in the automated valet parking.

Yet another aspect of the present disclosure is an automated valet parking system that causes an autonomous driving vehicle in a parking place to perform automated valet parking by instructing the autonomous driving vehicle. The automated valet parking system includes an illuminance information acquisition unit configured to acquire illuminance information of front lighting devices of the autonomous driving vehicle, an illuminance suppression point setting unit configured to set an illuminance suppression point which is a position in the parking place at which illuminance of the front lighting devices of the autonomous driving vehicle is suppressed based on parking place map information of the parking place and the illuminance information of the front lighting devices of the autonomous driving vehicle, and an illuminance suppression instruction unit configured to instruct the autonomous driving vehicle to perform illuminance suppression at the illuminance suppression point.

In accordance with the automated valet parking system according to still another aspect of the present disclosure, since the illuminance suppression point which is the position in the parking place at which the illuminance of the front lighting devices of the autonomous driving vehicle is suppressed is set based on the parking place map information of the parking place and the illuminance information of the front lighting devices of the autonomous driving vehicle and the instruction about the illuminance suppression at the illuminance suppression point is given to the autonomous driving vehicle, it is possible to reduce the hindrance the recognition of the autonomous driving vehicle or improper influence on surroundings by the illuminance of the front lighting devices.

According to each aspect of the present disclosure, it is possible to reduce the hindrance the recognition of the autonomous driving vehicle or improper influence on surroundings by the illuminance of the front lighting devices in the automated valet parking.

DETAILED DESCRIPTION

Hereinafter, an embodiment of the present disclosure will be described with reference to the drawings.

Figure 1:
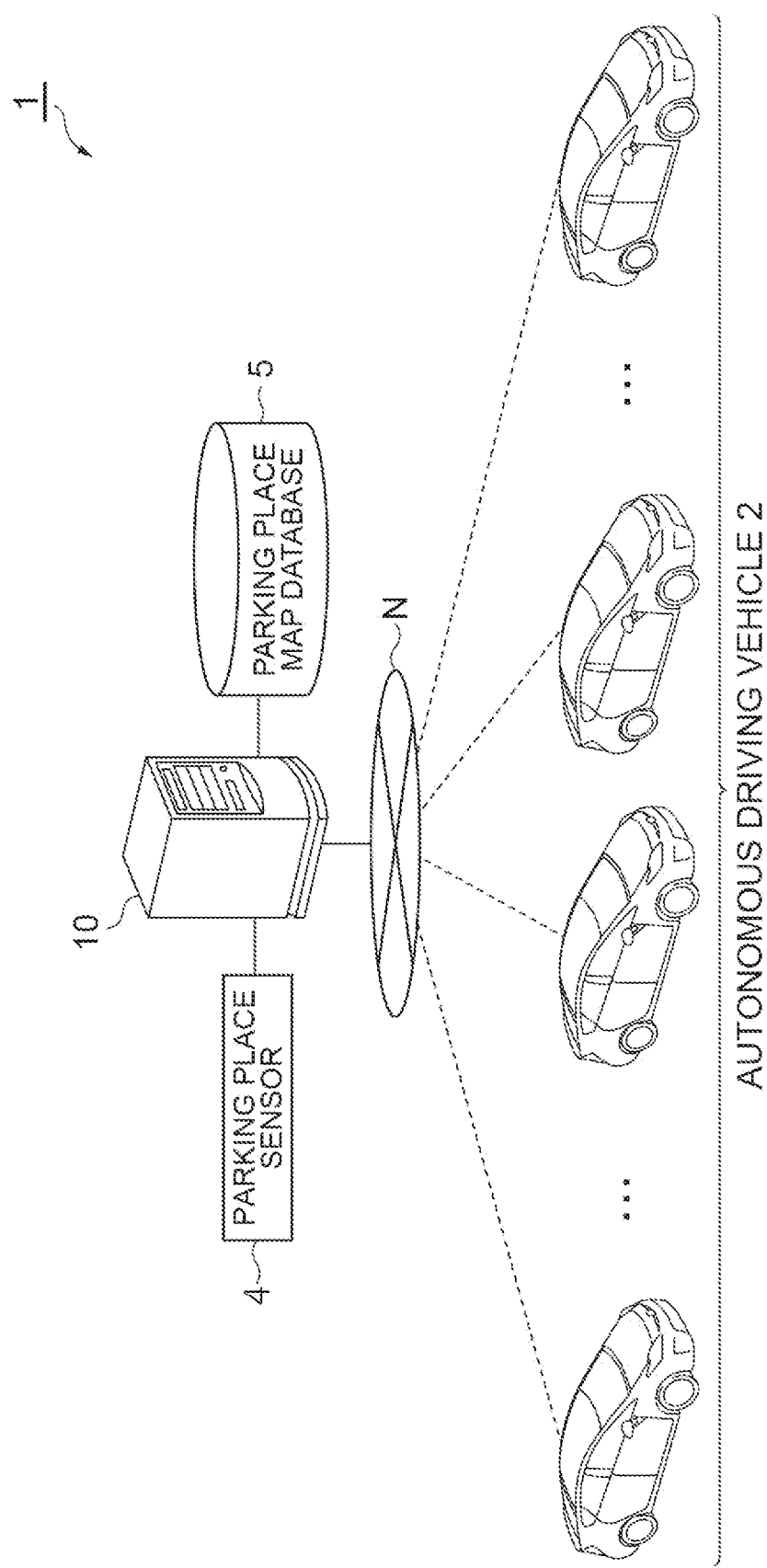
FIG. 1 is a diagram for describing an automated valet parking system according to an embodiment.

FIG. 1 is a diagram for describing an automated valet parking system according to the embodiment. An automated valet parking system (AVPS) 1 illustrated in FIG. 1 is a system for performing automated valet parking of a plurality of autonomous driving vehicles 2 in a parking place. The automated valet parking system 1 has an automated valet parking server 10 for performing automated valet parking. The automated valet parking server 10 is connected to be able to communicate with the autonomous driving vehicles 2 via a network N. The network N is a wireless communication network.

The automated valet parking is a service that allows a driverless autonomous driving vehicle 2, after a user (occupant) has got out of the vehicle at a drop-off area in a parking place, to travel on a target route according to an instruction from the parking place side, and that automatically parks the vehicle in a target parking space in the parking place. The target parking space is a parking space preset as a parking position of the autonomous driving vehicle 2. The target route is a route in the parking place where the autonomous driving vehicle 2 travels to reach the target parking space. The target route at the time of pick-up is a route on which the vehicle travels to reach a pick up space to be described later.

Figure 2:
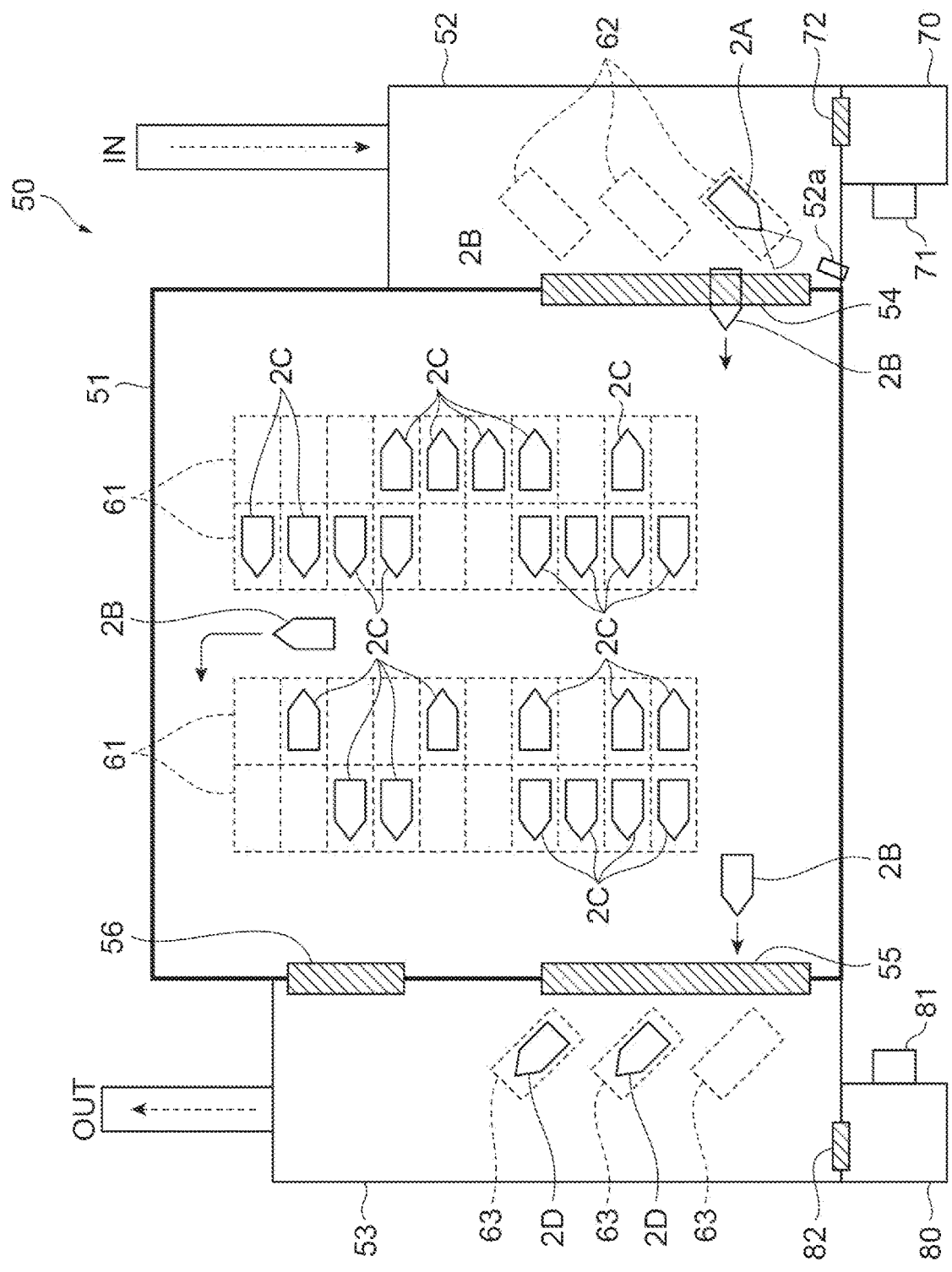
FIG. 2 is a plan view illustrating an example of a parking place where automated valet parking is performed.

Here, FIG. 2 is a plan view illustrating an example of a parking place where automated valet parking is performed. FIG. 2 illustrates a parking place 50, a parking area 51, a drop-off area 52, and a pick up area 53. The parking place 50 includes the parking area 51, the drop-off area 52, and the pick up area 53. The drop-off area 52 and the pick up area 53 may not be provided separately, and may be provided as an integrated platform.

The parking area 51 is a place where parking spaces (parking frames) 61 in which the autonomous driving vehicles 2 are parked by the automated valet parking are formed. As illustrated in FIG. 2, for example, a plurality of parking spaces 61 are formed side by side in one direction (for example, a vehicle width direction of a parked vehicle).

The drop-off area 52 is provided near an entrance side of the parking place 50, and is a place where the user gets out of the autonomous driving vehicle 2 before entering the parking space. Drop-off spaces 62 for the autonomous driving vehicle 2 to stop when the user gets out of the vehicle are formed in the drop-off area 52. The drop-off area 52 leads to the parking area 51 via a parking area entrance gate 54.

A parking place camera 52a capable of capturing an image of the autonomous driving vehicle 2 stopped in the drop-off space 62 is provided in the drop-off area 52. The parking place camera 52a functions as an illuminance measurement device for measuring illuminance of front lighting devices of the autonomous driving vehicle 2. The details of the illuminance measurement will be described later.

A facility entrance elevator hall 70 for the user who gets off the autonomous driving vehicle 2 to enter a facility such as a commercial facility is connected to the drop-off area 52. The facility entrance elevator hall 70 may not be directly connected to the drop-off area 52, and may be connected via a passage or the like. An automatic door 72 on a facility entrance side between the drop-off area 52 and an elevator 71 for moving to a different level is provided in the facility entrance elevator hall 70.

The pick up area 53 is provided near an exit side of the parking place 50, and is a place where the user gets on the autonomous driving vehicle 2 that has been picked up. Pick up spaces 63 where the autonomous driving vehicle 2 waits for the user to get on the vehicle are formed in the pick up area 53. The pick up area 53 leads to the parking area 51 via a parking area exit gate 55. A return gate 56 for returning the autonomous driving vehicle 2 from the pick up area 53 to the parking area 51 is provided between the pick up area 53 and the parking area 51. The return gate 56 is not essential.

A facility exit elevator hall 80 for the user to return to the parking place 50 from a facility such as a commercial facility is connected to the pick up area 53. The facility exit elevator hall 80 may not be directly connected to the pick up area 53, and may be connected via a passage or the like. An automatic door 82 on a facility exit side between the pick up area 53 and an elevator 81 for moving to a different level is provided in the facility exit elevator hall 80.

In FIG. 2, an autonomous driving vehicle 2A stopped in the drop-off space 62 of the drop-off area 52, autonomous driving vehicles 2B traveling in the parking place 50, autonomous driving vehicles 2C parked in the parking spaces 61 of the parking area 51, and autonomous driving vehicles 2D stopped in the pick up spaces 63 of the pick up area 53 are illustrated.

In the automated valet parking system 1, for example, after the autonomous driving vehicle 2 that has entered the parking place 50 drops off the user in the drop-off space 62, the automated valet parking is started by obtaining an instruction authority of the autonomous driving vehicle 2. The automated valet parking system 1 causes the autonomous driving vehicle 2B that is parked to travel toward the pick up area 53 in response to a pick up request, and causes the autonomous driving vehicle to wait for the user to arrive in the pick up space 63.

[Configuration of Automated Valet Parking System (Automated Valet Parking Server)]

Next, a configuration of the automated valet parking system 1 will be described with reference to the drawings. As illustrated in FIG. 1, the automated valet parking system 1 includes the automated valet parking server 10. The automated valet parking server 10 is a server for managing the parking place.

The automated valet parking server 10 is configured to be able to communicate with the autonomous driving vehicles 2. The autonomous driving vehicle 2 will be described in detail later. The automated valet parking server 10 may be provided in the parking place or may be provided in a facility away from the parking place. The automated valet parking server 10 may include a plurality of computers provided at different places. The automated valet parking server 10 is connected to a parking place sensor 4 and a parking place map database 5.

The parking place sensor 4 is a sensor for recognizing a status in the parking place. The parking place sensor 4 includes, for example, a parking place camera for detecting a position of the vehicle in the parking place. The parking place camera is provided on a ceiling or a wall of the parking place, and captures an image of the autonomous driving vehicle 2 in the parking place. The parking place camera transmits the captured image to the automated valet parking server 10.

The parking place sensor 4 may include an empty sensor for detecting whether or not there is the parked vehicle in the parking frame (whether the parking frame is occupied or empty). The empty sensor may be provided for each parking frame, or may be provided on a ceiling or the like to be able to monitor a plurality of parking frames by one sensor. The configuration of the empty sensor is not particularly limited, and a known configuration can be employed. The empty sensor may be a pressure sensor, a radar sensor or a sonar sensor using radio waves, or a camera. The empty sensor transmits empty information in the parking frame to the automated valet parking server 10. The parking place sensor 4 may include a gate sensor that detects a vehicle (entering vehicle) passing through an entrance gate of the parking place. The entrance gate can be provided, for example, in front of the drop-off area 52.

The parking place map database 5 is a database that stores parking place map information. The parking place map information includes positional information of the parking frame in the parking place and information on a traveling path in the parking place. The parking place map information may include positional information of a landmark used for position recognition of the autonomous driving vehicle 2. As an example, the landmark for host vehicle position estimation can be a predetermined mark (pattern or code) drawn on a floor or a wall. The landmark for host vehicle position estimation may include at least one of a white line, a pole, a safety cone, a fence, a pillar of the parking place, and the like.

Parking place lighting information is also stored in the parking place map database 5. The parking place lighting information is information on the illuminance in the parking place. The parking place lighting information includes information on the illuminance corresponding to a position of the parking place by lighting equipment in the parking place. The parking place lighting information may include information on the illuminance at a position in the parking place corresponding to a time zone. The time zone may be divided into only two divisions of daytime and nighttime, may be divided into three divisions of morning, noon, and night, and may be divided into one hour or two hours.

The illuminance information may include information on illuminance due to light from the outside such as the sun or lighting equipment of other facilities outside the parking place. The parking place lighting information may include information on the illuminance due to light from the outside and the illuminance due to the lighting equipment in the parking place corresponding to the time zone. The parking place lighting information may be stored in a database different from the parking place map database 5.

Figure 3:
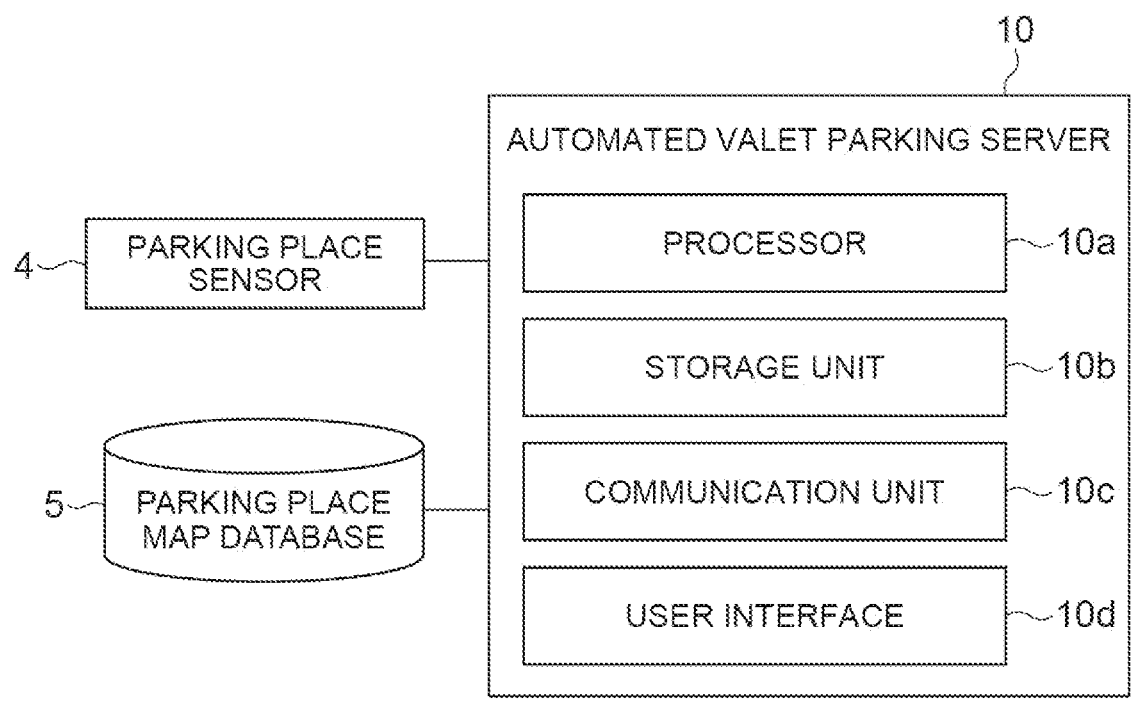
FIG. 3 is a diagram illustrating an example of a hardware configuration of an automated valet parking server.

A hardware configuration of the automated valet parking server 10 will be described. FIG. 3 is a block diagram illustrating an example of the hardware configuration of the automated valet parking server. As illustrated in FIG. 3, the automated valet parking server 10 is a general computer that includes a processor 10a, a storage unit 10b, a communication unit 10c, and a user interface 10d.

The processor 10a operates various operating systems to control the automated valet parking server 10. The processor 10a is an arithmetic logic unit such as a central processing unit (CPU) including a control device, an arithmetic device, a register, and the like. The processor 10a controls the storage unit 10b, the communication unit 10c, and the user interface 10d. The storage unit 10b is, for example, a recording medium including at least one of a read only memory (ROM), a random access memory (RAM), a hard disk drive (HDD), and a solid state drive (SSD).

The communication unit 10c is a communication device for performing wireless communication through the network N. As the communication unit 10c, a network device, a network controller, a network card, or the like can be used. The automated valet parking server 10 communicates with the autonomous driving vehicles 2 by using the communication unit 10c. The user interface 10d is an input and output unit of the automated valet parking server 10 for an administrator of the automated valet parking server 10 or the like. The user interface 10d includes an output device such as a display and a speaker, and an input device such as a touch panel.

Figure 4:
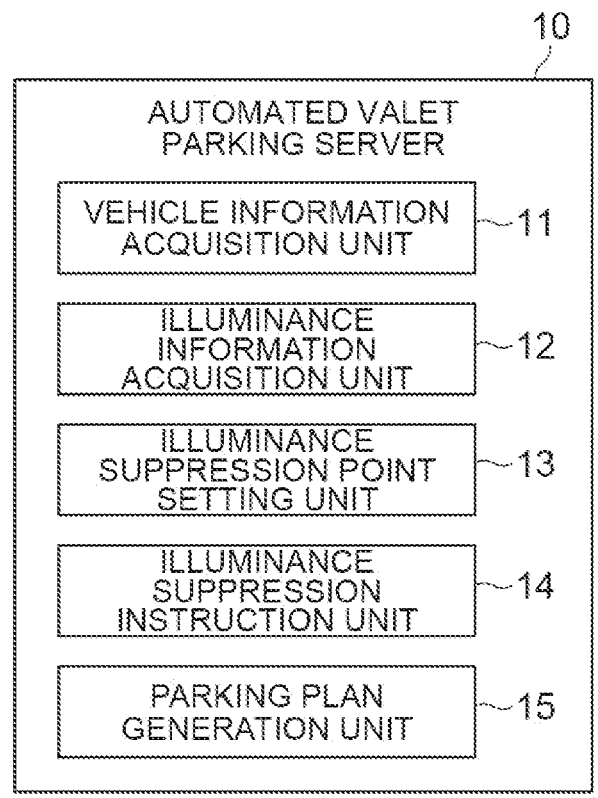
FIG. 4 is a diagram illustrating an example of a functional configuration of the automated valet parking server.

Next, a functional configuration of the automated valet parking server 10 will be described. FIG. 4 is a diagram illustrating an example of the functional configuration of the automated valet parking server 10. The automated valet parking server includes a vehicle information acquisition unit 11, an illuminance information acquisition unit 12, an illuminance suppression point setting unit 13, an illuminance suppression instruction unit 14, and a parking plan generation unit 15.

The vehicle information acquisition unit 11 acquires vehicle information of the autonomous driving vehicle 2 that is a target of automated valet parking. The vehicle information acquisition unit 11 acquires vehicle information of the autonomous driving vehicle 2 in the parking place through communication with the autonomous driving vehicle 2.

The vehicle information includes positional information of the vehicle in the parking place. The vehicle information may include identification information of the autonomous driving vehicle 2. The identification information may be information capable of individually specifying the autonomous driving vehicles 2, may be an identification number (ID number) acquired through communication, may be a vehicle number, may be a reservation number for automated valet parking, or the like.

The vehicle information may include recognition results of a traveling state of the autonomous driving vehicle 2 and an external environment. The recognition of the traveling state and the external environment will be described later. The vehicle information of the autonomous driving vehicle 2 may include information on the remaining mileage or remaining fuel of the autonomous driving vehicle 2.

The vehicle information acquisition unit 11 continuously acquires the vehicle information from the autonomous driving vehicle 2 while automated valet parking is executed. While the autonomous driving vehicle 2 is parked, the vehicle information acquisition unit 11 may interrupt the acquisition of the vehicle information, or may periodically acquire the vehicle information.

The vehicle information acquisition unit 11 recognizes a status of the autonomous driving vehicle 2 during automated valet parking based on the acquired vehicle information. The status of the autonomous driving vehicle 2 includes the position of the autonomous driving vehicle 2 in the parking place. The status of the autonomous driving vehicle 2 may include a vehicle speed of the autonomous driving vehicle 2, may include a yaw rate of the autonomous driving vehicle 2, and may include a distance between the autonomous driving vehicle 2 and another surrounding vehicle.

The illuminance information acquisition unit 12 acquires the illuminance information of the front lighting devices when the front lighting devices of the autonomous driving vehicle 2 are turned on. The front lighting device is a lighting device that illuminates in front of the autonomous driving vehicle 2. The front lighting devices include headlights (headlamps). The front lighting devices may include small lights (front position lamps) or fog lamps.

The illuminance information of the front lighting devices includes information on the illuminance of the front lighting devices. The illuminance information of the front lighting devices includes information on the illuminance of the headlights. The illuminance information of the front lighting devices may include information regarding an illumination range of the headlights. When the illuminance of the headlights can be changed to a plurality of stages, the illuminance of each stage may be included. The illuminance information of the front lighting devices may include information regarding the illuminance of the small lights, or may include information regarding the illuminance of the fog lamp.

The illuminance information acquisition unit 12 acquires the illuminance information of the front lighting devices of the autonomous driving vehicle 2 by, for example, capturing an image of the front lighting devices that is turned on by the parking place camera. In this case, the parking place camera corresponds to an illuminance measuring device. A well-known image analysis method can be used as a method for recognizing the illuminance information of the front lighting devices from the image captured by the parking place camera.

The illuminance information acquisition unit 12 may acquire the illuminance information of the front lighting devices of the autonomous driving vehicle 2 by stopping the autonomous driving vehicle 2 at a predetermined illuminance measurement position in the parking place, turning on the front lighting devices, and capturing an image with the parking place camera. The illuminance measurement position is not particularly limited, but a space may be provided at the entrance of the parking place, or the drop-off space in the drop-off area may be used.

Specifically, the illuminance information acquisition unit 12 may acquire the illuminance information of the front lighting devices of the autonomous driving vehicle 2 (autonomous driving vehicle 2A) from the captured image of the parking place camera 52*a* that captures the image of the autonomous driving vehicle 2 stopped in the drop-off space 62 in the drop-off area 52 of the parking place 50 of FIG. 2. The illuminance information acquisition unit 12 may not determine the illuminance measurement position, and may acquire illuminance information of the front lighting devices of the autonomous driving vehicle 2 by causing the parking place camera to capture the image of the autonomous driving vehicle 2 traveling while turning on the front lighting devices.

The illuminance information acquisition unit 12 may acquire the illuminance information corresponding to a lighting state of the front lighting devices by changing the lighting state of the headlights and/or the small lights as the front lighting devices in the autonomous driving vehicle 2.

Alternatively, the illuminance information acquisition unit 12 may acquire the illuminance information from image information captured by a front camera of the autonomous driving vehicle 2 while the front lighting devices of the autonomous driving vehicle 2 are turned on. The illuminance information acquisition unit 12 acquires the image information captured by the front camera of the autonomous driving vehicle 2 while the front lighting devices are turned on by communicating with the autonomous driving vehicle 2.

The illuminance information acquisition unit 12 may acquire the illuminance information of the front lighting devices from the captured image information of the autonomous driving vehicle 2 by stopping the autonomous driving vehicle 2 at the predetermined illuminance measurement position in the parking place, turning on the front lighting devices, and causing the front camera of the autonomous driving vehicle 2 to capture the image. The illuminance information acquisition unit 12 may acquire the illuminance information corresponding to the lighting state of the front lighting devices by obtaining the image information while changing the lighting state of the headlights and/or the small lights as the front lighting devices in the autonomous driving vehicle 2.

The illuminance suppression point setting unit 13 sets an illuminance suppression point which is a position in the parking place at which the illuminance of the front lighting devices of the autonomous driving vehicle 2 is suppressed based on the parking place map information and the parking place lighting information of the parking place map database 5 and the illuminance information of the front lighting devices of the autonomous driving vehicle 2 acquired by the illuminance information acquisition unit 12.

The illuminance suppression point setting unit 13 sets, for example, an illuminance suppression point at a position corresponding to the landmark for host vehicle position estimation of the autonomous driving vehicle 2 provided in the parking place. The landmark for host vehicle position estimation is not particularly limited as long as the landmark can be used for host vehicle position estimation by an external sensor including the camera of the autonomous driving vehicle 2.

As an example, the illuminance suppression point setting unit 13 may set the illuminance suppression point at a position corresponding to the landmark for host vehicle position estimation having a concern that overexposure occurs on the image of the front camera of the autonomous driving vehicle 2 due to the influence of the illuminance by the lighting equipment of the parking place and the illuminance of the front lighting devices of the autonomous driving vehicle 2.

The illuminance suppression point setting unit 13 may set the illuminance suppression point when a total illuminance of the illuminance of the lighting equipment of the parking place and the illuminance of the front lighting devices of the autonomous driving vehicle 2 is equal to or higher than a total illuminance threshold value for a landmark included in the illumination range of the lighting equipment of the parking place. The total illuminance threshold value is a threshold value of a preset value. The method for calculating the total illuminance is not particularly limited. The total illuminance may be obtained by simply summing the illuminances, or may be calculated by taking into account the attenuation of the illuminance due to a distance from the front lighting devices or lighting equipment 93.

Figure 5:
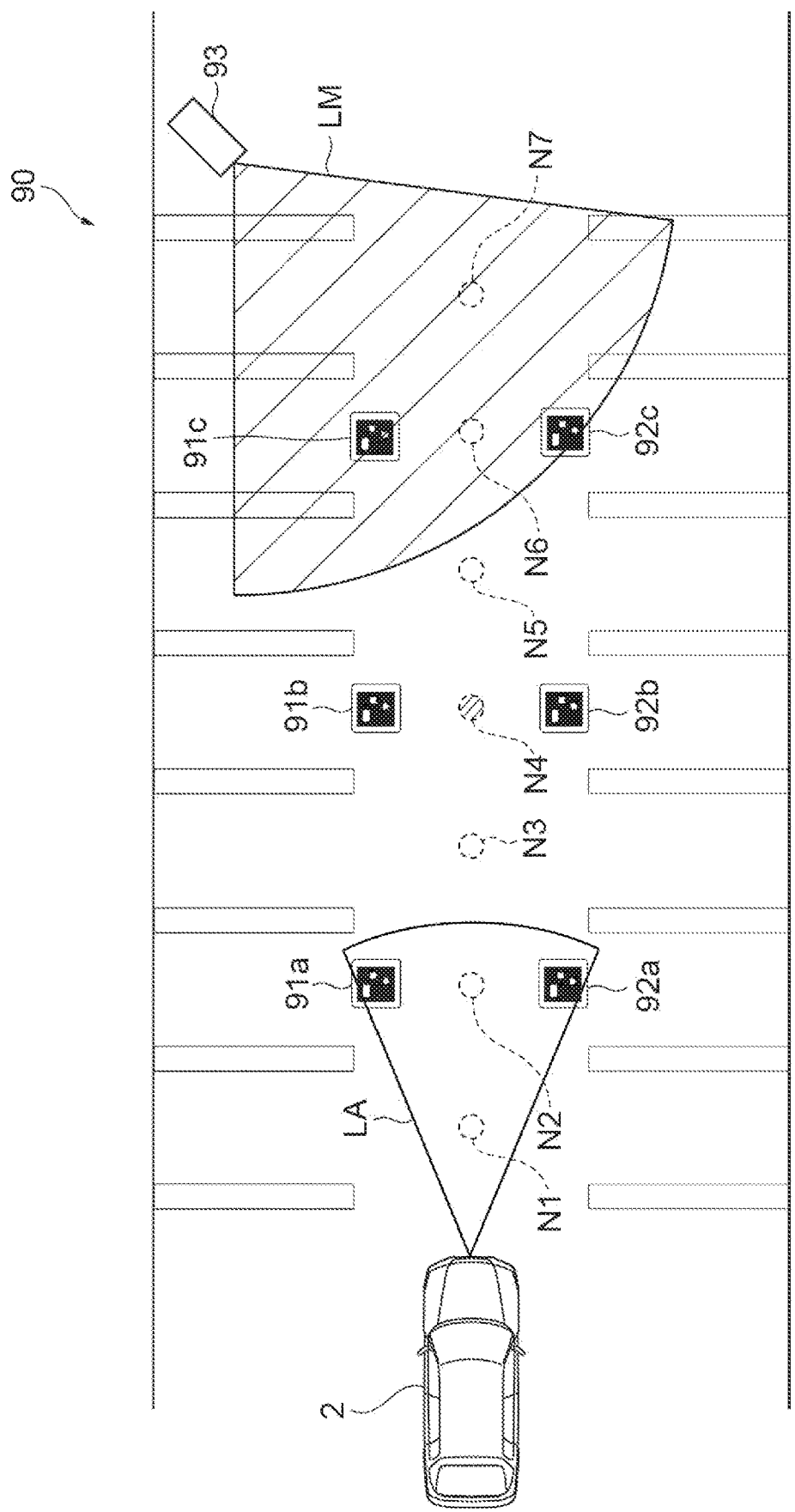
FIG. 5 is a plan view for describing an example of an illuminance suppression point.

Here, FIG. 5 is a plan view for describing an example of the illuminance suppression point. FIG. 5 illustrates a parking area 90, the autonomous driving vehicle 2, an illumination range LA of the front lighting devices (headlights) of the autonomous driving vehicle 2, landmarks 91a to 91c and 92a to 92c for host vehicle position estimation, and lighting equipment 93 of the parking place, and an illumination range LM of the lighting equipment 93. Nodes N1 to N7 corresponding to positions in the parking place are illustrated. The landmarks 91a to 91c and 92a to 92c are marks for host vehicle position estimation drawn on a floor.

As illustrated in FIG. 5, for example, the landmarks 91c and 92c are included in the illumination range LM of the lighting equipment 93 and the landmarks 91a and 92a are included in the illumination range LA of the front lighting devices of the autonomous driving vehicle 2. Thus, since there is a concern that overexposure may occur, the illuminance suppression point setting unit 13 sets the illuminance suppression point in the node N4.

The illuminance suppression point setting unit 13 sets the illuminance suppression point based on the illuminance information of the lighting equipment 93 included in the parking place lighting information and illumination information of the front lighting devices of the autonomous driving vehicle 2. The illuminance suppression point setting unit 13 may estimate a total illuminance near the landmarks 91c and 92c when the autonomous driving vehicle 2 reaches the nodes N1 to N7 based on, for example, the information on the illuminance of the lighting equipment 93 and the illumination information of the front lighting devices of the autonomous driving vehicle 2, and may set the illuminance suppression point on the assumption that there is a concern that overexposure occurs in the landmarks 91c and 92c when the estimated total illuminance is equal to or higher than the total illuminance threshold value.

When the illuminance information of the front lighting devices of the autonomous driving vehicle 2 does not include information on the illumination range of the front lighting devices, the illuminance suppression point setting unit 13 may assume, as the illumination range of the front lighting devices, a predetermined fan-shaped range with a leading end of the autonomous driving vehicle 2 as a criterion, and may set the illuminance suppression point.

The illuminance suppression point setting unit 13 may set the illuminance suppression point based on external light such as the sun or lighting equipment of an external facility. The external light changes mainly depending on the time zone. When the parking place lighting information includes the information on the illuminance in the parking place corresponding to the time zone, based on information on illuminance in the parking place corresponding to a current time, the illuminance suppression point setting unit 13 can set the illuminance suppression point based on illuminance of light from the outside.

The illuminance suppression point setting unit 13 may acquire illuminance information of the light from the outside at the current time by the parking place camera. In this case, it is possible to recognize not only the time zone but also the actual illuminance of the light from the outside corresponding to the weather and the like. The illuminance suppression point setting unit 13 may set the illuminance suppression point based on the illuminance information of the light from the outside at the current time acquired by the parking place camera and the illumination information of the front lighting devices of the autonomous driving vehicle 2.

The illuminance suppression point setting unit 13 may set the illuminance suppression point based on weather information in the case of an outdoor parking place. When recognition accuracy of a landmark on a floor surface deteriorates due to after rain or fog, the illuminance suppression point setting unit 13 may set the illuminance suppression point for turning off the headlights and turning on the fog light near the floor surface.

The illuminance suppression instruction unit 14 instructs the autonomous driving vehicle 2 that performs automated valet parking to perform the illuminance suppression at the illuminance suppression point. The illuminance suppression is to turn off a part or all of the front lighting devices. As the illuminance suppression, for example, the headlights of the front lighting devices are turned off and only the small lights are turned on. As the illuminance suppression, the front lighting devices may be entirely turned off.

For example, the illuminance suppression instruction unit 14 gives an instruction about the illuminance suppression point to the autonomous driving vehicle 2 in advance, and causes the autonomous driving vehicle to perform the illuminance suppression when it is determined that the autonomous driving vehicle 2 reaches the illuminance suppression point.

Figure 6:
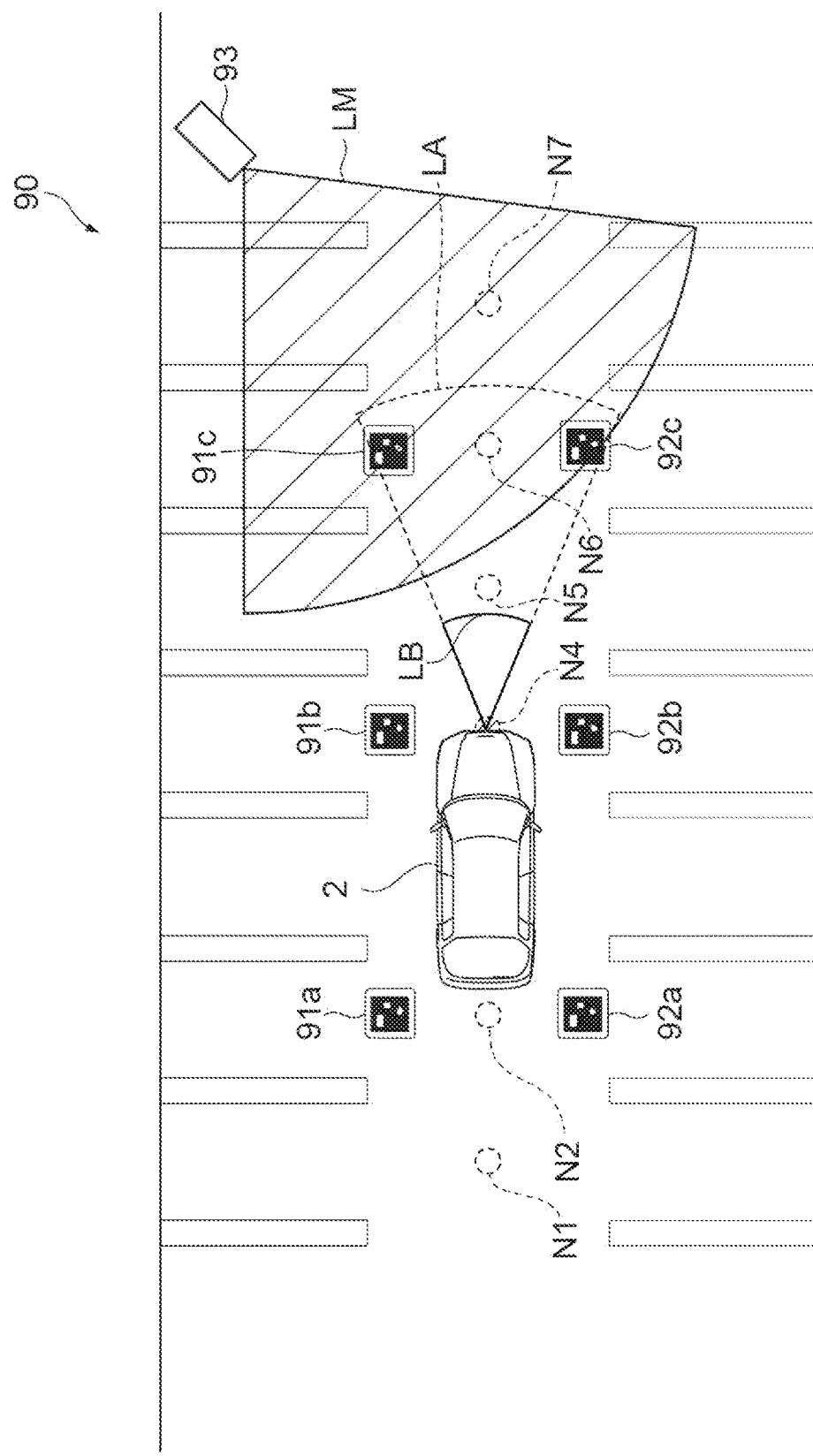
FIG. 6 is a plan view for describing a situation in which illuminance suppression is performed.

FIG. 6 is a plan view for describing a situation in which the illuminance suppression is performed. FIG. 6 illustrates an illumination range LB of the small lights of the autonomous driving vehicle 2. In the situation illustrated in FIG. 6, the illuminance suppression instruction unit 14 instructs the autonomous driving vehicle 2 to perform the illuminance suppression at the illuminance suppression point in advance.

The autonomous driving vehicle 2 determines whether or not the autonomous driving vehicle reaches the node N4 set as the illuminance suppression point by using the position information of the host vehicle and the parking place map information, and performs the illuminance suppression of the front lighting devices when it is determined that the autonomous driving vehicle reaches the node N4. The autonomous driving vehicle 2 avoids overexposure in the landmarks 91c and 92c by, for example, turning off the headlights and changing to the small lights. In the autonomous driving vehicle 2, all of the front lighting devices may be turned off. When it is determined that the autonomous driving vehicle 2 has passed the node N4, for example, the illuminance suppression of the front lighting devices is canceled.

The illuminance suppression instruction unit 14 may determine for itself whether or not the autonomous driving vehicle 2 reaches the illuminance suppression point without notifying the autonomous driving vehicle 2 of the illuminance suppression point. When the illuminance suppression instruction unit 14 may instruct the autonomous driving vehicle 2 to perform the illuminance suppression when it is determined that the autonomous driving vehicle 2 reaches the illuminance suppression point based on the positional information of the autonomous driving vehicle 2 in the parking place acquired from the autonomous driving vehicle 2 and the illuminance suppression point. The autonomous driving vehicle 2 performs the illuminance suppression of the front lighting devices according to the instruction of the illuminance suppression instruction unit 14.

Figure 7A:
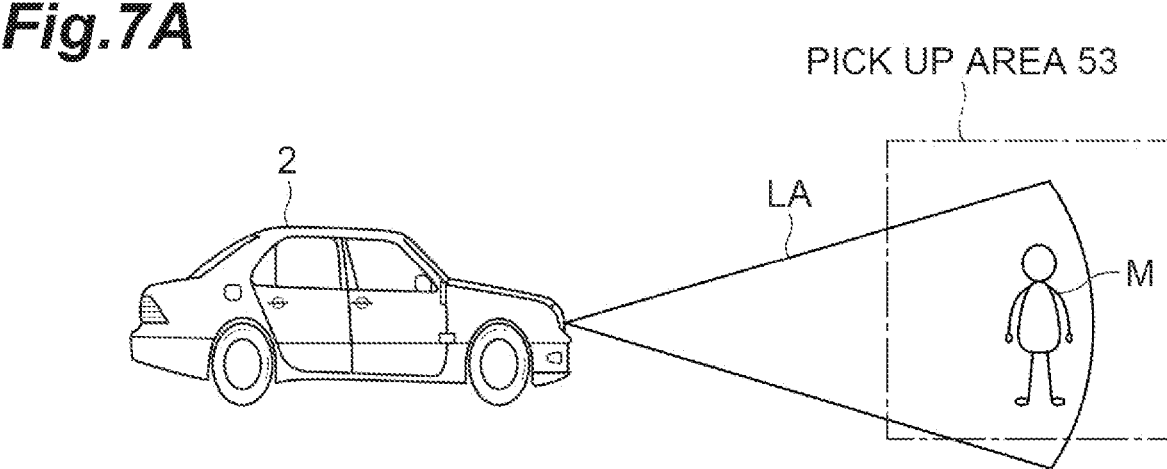
FIG. 7A is a diagram for describing a situation in which illumination of front lighting devices of an autonomous driving vehicle influences a pedestrian at a drop-off area.

Next, the illuminance suppression of the front lighting devices of the autonomous driving vehicle 2 to the user in the parking place will be described. FIG. 7A is a diagram for describing a situation in which the illumination of the front lighting devices of the autonomous driving vehicle 2 influences the user in the pick up area 53. FIG. 7A illustrates the autonomous driving vehicle 2, the illumination range LA of the front lighting devices (headlights) of the autonomous driving vehicle 2, and a user M in the pick up area 53.

As illustrated in FIG. 7A, the illumination of the front lighting devices of the autonomous driving vehicle 2 during automated valet parking may cause the user M to feel annoyed. The illuminance suppression point setting unit 13 may set the illuminance suppression point at a position before entering the pick up area 53 or a position in the pick up area 53 in order to prevent the illumination of the front lighting devices from causing the user M to feel annoyed.

Figure 7B:
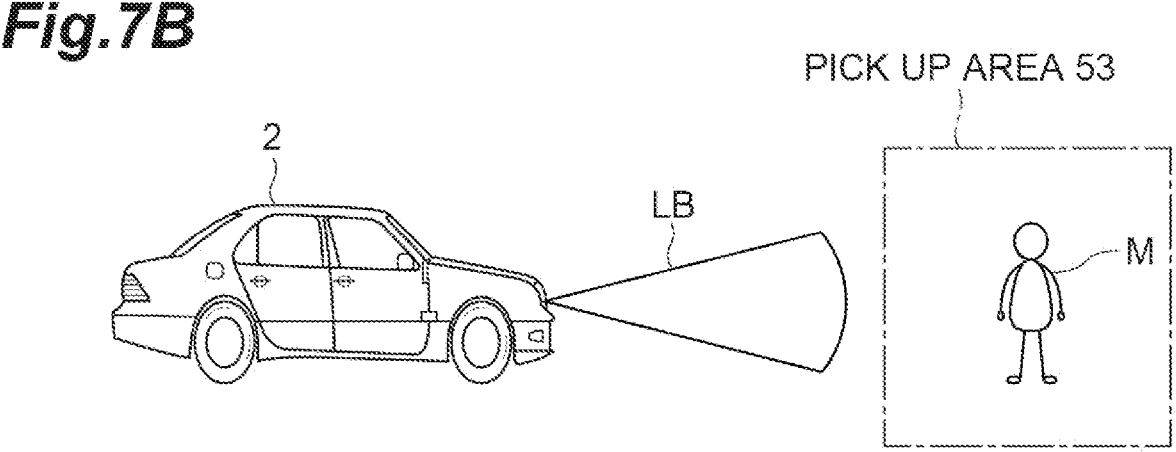
FIG. 7B is a diagram for describing a situation which illuminance suppression is performed.

FIG. 7B is a diagram for describing a situation in which the illuminance suppression is performed. FIG. 7B illustrates the illumination range LB of the small lights of the autonomous driving vehicle 2. As illustrated in FIG. 7B, the illuminance suppression instruction unit 14 gives the instruction about the illuminance suppression of the front lighting devices (for example, turning off the headlights) at the illuminance suppression point set at a position or the like before entering the pick up area 53. Accordingly, it is possible to suppress the illumination of the front lighting devices of the autonomous driving vehicle 2 from causing the user M to feel annoyed. When the illuminance of the front lighting devices of the autonomous driving vehicle 2 is less than a threshold value or the illumination range of the front lighting devices of the autonomous driving vehicle 2 is less than a certain distance, the illuminance suppression point setting unit 13 may determine not to set the illuminance suppression point at a position before entering the pick up area 53.

In addition, the automated valet parking server 10 may perform the illuminance suppression of the front lighting devices of the autonomous driving vehicle 2 on private houses or various facilities outside the parking place. When illumination light of the front lighting devices of the autonomous driving vehicle 2 in the parking place leaks to the private houses or various facilities outside the parking place, the illuminance suppression point setting unit 13 may set the illuminance suppression point at a position where the autonomous driving vehicle 2 faces the private house or various facilities outside the parking place. The illuminance suppression point setting unit 13 may set and cancel the illuminance suppression point according to a time zone such as nighttime. Accordingly, it is possible to prevent the illumination of the front lighting devices of the autonomous driving vehicle 2 during automated valet parking from influencing the private houses and various facilities outside the parking place.

The parking plan generation unit 15 generates a parking plan, which is a traveling plan for parking the autonomous driving vehicle 2, based on the vehicle information acquired by the vehicle information acquisition unit 11. The parking plan includes a target parking space in which the autonomous driving vehicle 2 is parked and a target route to the target parking space. For example, when a vehicle entrance request (start request for automated valet parking) is received from the autonomous driving vehicle 2 that has entered the parking place, the parking plan generation unit 15 starts generating the parking plan. The vehicle entrance request may be issued from a user terminal of the user instead of the autonomous driving vehicle 2.

The parking plan generation unit 15 sets the target parking space based on an empty status of the parking frame in the parking place recognized from the detection result of the parking place sensor 4. The parking plan generation unit 15 sets the target parking space for the parking space (parking frame) preset in the parking place. The parking plan generation unit 15 may set an appropriate target parking space corresponding to a size of the autonomous driving vehicle 2 based on vehicle body information of the autonomous driving vehicle 2.

The parking plan generation unit 15 sets a target route toward the target parking space from a current position of the autonomous driving vehicle 2 based on the positional information of the autonomous driving vehicle 2 acquired by the vehicle information acquisition unit 11, positional information of the target parking space, and the parking place map information of the parking place map database 5.

The parking plan generation unit 15 sets a target route on the traveling path in the parking place. The target route may not be a shortest distance, and a route that does not interfere with or has less interference with a target route of another autonomous driving vehicle 2 may be preferentially selected. The setting method of the target route is not particularly limited, and various well-known methods can be employed. The parking plan generation unit 15 performs the automated valet parking of the autonomous driving vehicle 2 by giving an instruction about the generated parking plan to the autonomous driving vehicle 2.

The parking plan generation unit 15 may be integrated with the illuminance suppression instruction unit 14. In this case, the parking plan generation unit 15 generates a parking plan including the illuminance suppression of the front lighting devices of the autonomous driving vehicle 2 corresponding to the position in the parking place based on the illuminance suppression point set by the illuminance suppression point setting unit 13. The autonomous driving vehicle 2 performs the illuminance suppression of the front lighting devices at the illuminance suppression point according to the parking plan.

[Configuration of Autonomous Driving Vehicle]

Figure 8:
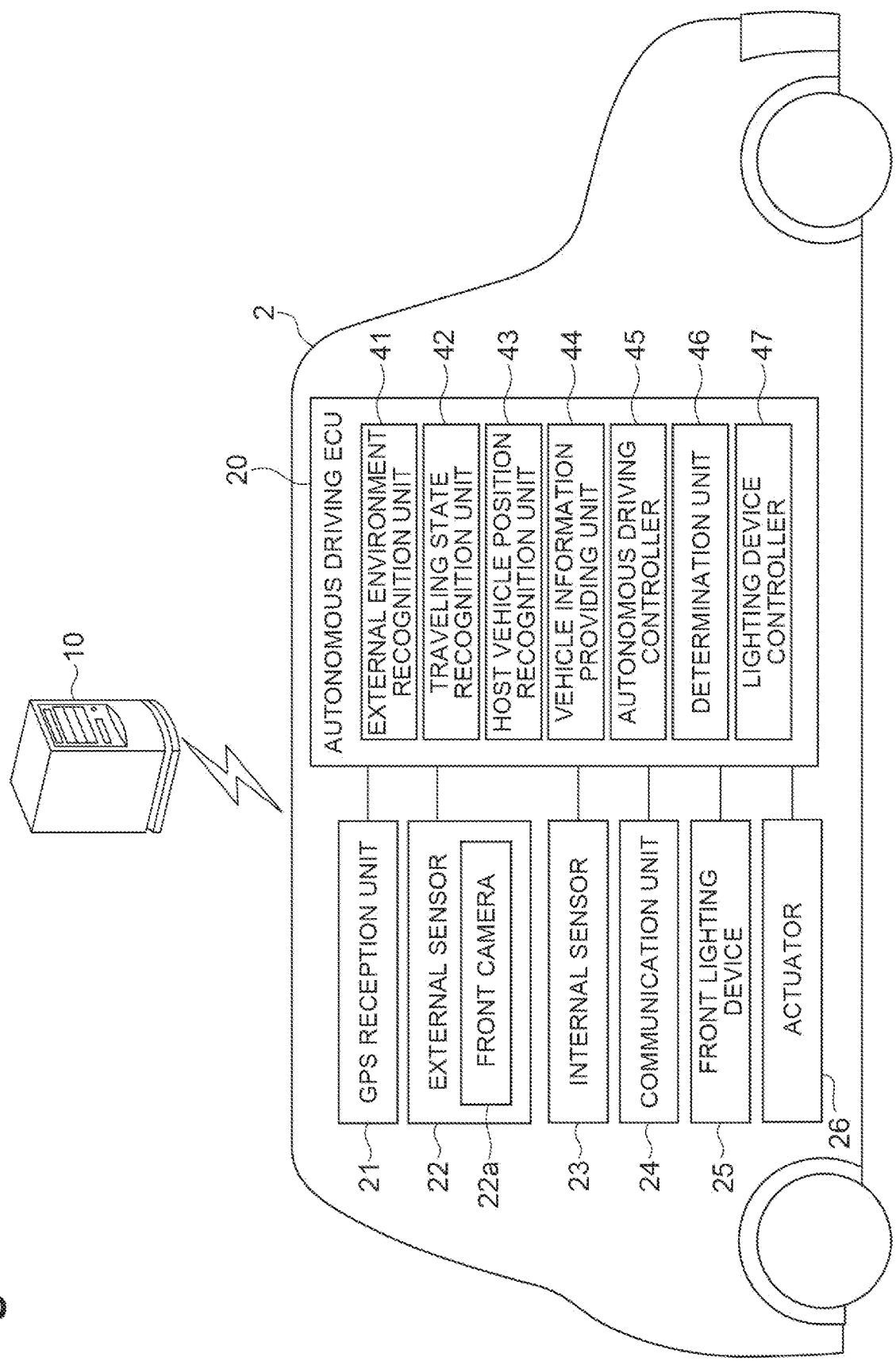
FIG. 8 is a block diagram illustrating an example of the autonomous driving vehicle.

Next, an example of a configuration of the autonomous driving vehicle 2 according to the present embodiment (autonomous driving vehicle as the target of the automated valet parking by the automated valet parking system 1). FIG. 8 is a block diagram illustrating an example of the autonomous driving vehicle 2.

As illustrated in FIG. 8, the autonomous driving vehicle 2 includes an autonomous driving ECU 20 as an example. The autonomous driving ECU 20 is an electronic control unit having a central processing unit (CPU) and a storage unit such as a read only memory (ROM) or a random access memory (RAM). In the autonomous driving ECU 20, for example, various functions are realized by the CPU executing a program stored in the storage unit. The autonomous driving ECU 20 may include a plurality of electronic units.

The autonomous driving ECU 20 is connected to a GPS reception unit 21, an external sensor 22, an internal sensor 23, a communication unit 24, and an actuator 26.

The GPS reception unit 21 measures a position of the autonomous driving vehicle 2 (for example, the latitude and longitude of the autonomous driving vehicle 2) by receiving signals from a plurality of GPS satellites. The GPS reception unit 21 transmits the measured positional information of the autonomous driving vehicle 2 to the autonomous driving ECU 20. A global navigation satellite system (GNSS) reception unit may be used instead of the GPS reception unit 21. When the parking place is indoors, the host vehicle position recognition using landmarks is also utilized as described later.

The external sensor 22 is an in-vehicle sensor that detects an external environment of the autonomous driving vehicle 2. The external sensor 22 includes at least a front camera 22a. The front camera 22a is an imaging device that captures an image of an external environment of the autonomous driving vehicle 2. The front camera 22a is provided, for example, behind a windshield of the autonomous driving vehicle 2 and captures an image in front of the vehicle. The front camera 22a transmits image information on the external environment of the autonomous driving vehicle 2 to the autonomous driving ECU 20. The front camera 22a may be a monocular camera or a stereo camera. The external sensor 22 may have a plurality of cameras in addition to the front camera 22a, and the plurality of cameras may be arranged to be able to capture lateral and rear sides of the autonomous driving vehicle 2.

The external sensor 22 may include a radar sensor. The radar sensor is a detection device that detects an object around the autonomous driving vehicle 2 using radio waves (for example, millimeter waves) or light. The radar sensor includes, for example, a millimeter wave radar or a light detection and ranging (LIDAR). The radar sensor transmits a radio wave or light to the vicinity of the autonomous driving vehicle 2 and detects the object by receiving the radio wave or light reflected by the object. The radar sensor transmits the detected object information to the autonomous driving ECU 20. The external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, wheel speed sensors that are provided for wheels of the autonomous driving vehicle 2 or for drive shafts that rotate integrally with the wheels and that detect rotation speeds of the respective wheels can be used. The vehicle speed sensor transmits the detected vehicle speed information (wheel speed information) to the autonomous driving ECU 20.

The acceleration sensor is a detector that detects the acceleration of the autonomous driving vehicle 2. The acceleration sensor includes, for example, a front-rear acceleration sensor that detects an acceleration in a front-rear direction of the autonomous driving vehicle 2. The acceleration sensor may include a lateral acceleration sensor that detects a lateral acceleration of the autonomous driving vehicle 2. The acceleration sensor transmits, for example, acceleration information of the autonomous driving vehicle 2 to the autonomous driving ECU 20. The yaw rate sensor is a detector that detects a yaw rate (rotational angular velocity) of the center of gravity of the autonomous driving vehicle 2 around a vertical axis. As the yaw rate sensor, for example, a gyro sensor can be used. The yaw rate sensor transmits the detected yaw rate information of the autonomous driving vehicle 2 to the autonomous driving ECU 20.

The communication unit 24 is a communication device that controls wireless communication with the outside of the autonomous driving vehicle 2. The communication unit 24 transmits and receives various types of information through communication with the automated valet parking server 10. The communication unit 24 transmits, for example, vehicle information to the automated valet parking server 10 and acquires information (for example, information on a landmark along a target route) needed for automated valet parking from the automated valet parking server 10.

The actuator 26 is a device used for controlling the autonomous driving vehicle 2. The actuator 26 includes at least a drive actuator, a brake actuator, and a steering actuator. The drive actuator controls the supply amount of air to the engine (throttle opening degree) according to a control signal from the autonomous driving ECU 20 to control a driving force of the autonomous driving vehicle 2. When the autonomous driving vehicle 2 is a hybrid vehicle, the control signal from the autonomous driving ECU 20 is input to a motor as a power source in addition to the supply amount of air to the engine, so that the driving force of the autonomous driving vehicle is controlled. When the autonomous driving vehicle 2 is an electric vehicle, the control signal from the autonomous driving ECU 20 is input to a motor as a power source, so that the driving force of the autonomous driving vehicle is controlled. The motor as the power source in these cases forms the actuator 26.

The brake actuator controls a brake system according to the control signal from the autonomous driving ECU 20 to control a braking force applied to the wheels of the autonomous driving vehicle 2. As the brake system, for example, a hydraulic brake system can be used. The steering actuator controls driving of an assist motor for controlling a steering torque in an electric power steering system according to the control signal from the autonomous driving ECU 20. Accordingly, the steering actuator controls the steering torque of the autonomous driving vehicle 2.

Next, an example of a functional configuration of the autonomous driving ECU 20 will be described. The autonomous driving ECU 20 includes an external environment recognition unit 41, a traveling state recognition unit 42, a host vehicle position recognition unit 43, a vehicle information providing unit 44, an autonomous driving controller 45, a determination unit 46, and a lighting device controller 47.

The external environment recognition unit 41 recognizes the external environment of the autonomous driving vehicle 2 based on the detection result of the external sensor 22 (the image captured by the camera or the object information detected by the radar sensor). The external environment includes a relative position of a surrounding object with respect to the autonomous driving vehicle 2. The external environment may include a relative speed and a moving direction of the surrounding object with respect to the autonomous driving vehicle 2. The external environment recognition unit 41 recognizes other vehicles and objects such as pillars of the parking place by pattern matching or the like. The external environment recognition unit 41 may recognize a parking place gate, a parking place wall, a pole, a safety cone, and the like. The external environment recognition unit 41 may recognize driving boundaries in the parking place by white line recognition.

The traveling state recognition unit 42 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 42 recognizes the vehicle speed of the autonomous driving vehicle 2 based on the vehicle speed information of the vehicle speed sensor. The traveling state recognition unit 42 recognizes the acceleration of the autonomous driving vehicle 2 based on the vehicle speed information of the acceleration sensor. The traveling state recognition unit 42 recognizes the direction of the autonomous driving vehicle 2 based on the yaw rate information of the yaw rate sensor.

The host vehicle position recognition unit 43 recognized the position of the autonomous driving vehicle 2 in the parking place based on the parking place map information acquired from the automated valet parking server 10 through the communication unit 24 and the external environment recognized by the external environment recognition unit 41.

The host vehicle position recognition unit 43 recognizes the position of the autonomous driving vehicle 2 in the parking place based on the positional information of the landmark in the parking place included in the parking place map information and the relative position of the landmark with respect to the autonomous driving vehicle 2 recognized by the external environment recognition unit 41. As the landmark, an object fixedly provided in the parking place can be used.

In addition, the host vehicle position recognition unit 43 may recognize the position of the autonomous driving vehicle 2 by dead reckoning based on the detection result of the internal sensor 23. The host vehicle position recognition unit 43 may recognize the position of the autonomous driving vehicle 2 by communicating with a beacon provided in the parking place.

The vehicle information providing unit 44 provides vehicle information to the automated valet parking server 10 through the communication unit 24. The vehicle information providing unit 44 provides, to the automated valet parking server 10, vehicle information including, for example, information on the position of the autonomous driving vehicle 2 in the parking place recognized by the host vehicle position recognition unit 43 at regular intervals. The vehicle information may include the recognized external status and/or traveling state of the autonomous driving vehicle 2.

The autonomous driving controller 45 executes the autonomous driving of the autonomous driving vehicle 2. The autonomous driving controller 45 generates a trajectory of the autonomous driving vehicle 2 based on, for example, the target route, the position of the autonomous driving vehicle 2, the external environment of the autonomous driving vehicle 2, and the traveling state of the autonomous driving vehicle 2. The trajectory corresponds to a travel plan for autonomous driving. The trajectory includes a path along which the vehicle travels by autonomous driving and a vehicle speed plan in autonomous driving.

The path is a trajectory on which the vehicle that is autonomously driving will travel on the target route as instructed to the automated valet parking system. The path can be, for example, data of a change in the steering angle of the autonomous driving vehicle 2 based on the position on the target route (steering angle plan). The position on the target route is, for example, a set vertical position set at predetermined intervals (for example, 1 m) in the advancing direction on the target route. The steering angle plan is data in which a target steering angle is associated with each set vertical position. The autonomous driving controller 45 generates a trajectory to pass through the center of the traveling path of the parking place along the target route, for example.

When the parking plan (target parking space and the target route) is instructed from the parking plan generation unit 15 of the automated valet parking server 10 in the automated valet parking, the autonomous driving controller 45 performs the automated valet parking according to the parking plan. When the parking plan does not include a steering angle plan and the vehicle speed plan corresponding to the position, the autonomous driving controller 45 generates the steering angle plan and the vehicle speed plan on the autonomous driving vehicle 2 side to realize the automated valet parking.

The determination unit 46 determines whether or not the autonomous driving vehicle 2 reaches the illuminance suppression point based on the host vehicle position recognized by the host vehicle position recognition unit 43 and the illuminance suppression point instructed by the automated valet parking server 10. When the autonomous driving vehicle 2 reaches the node N4 in the situation illustrated in FIG. 6, for example, the determination unit 46 determines that the autonomous driving vehicle 2 reaches the illuminance suppression point. The determination as to whether or not the autonomous driving vehicle 2 reaches the node N4 may be performed based on a center position of the autonomous driving vehicle 2 instead of the leading end of the autonomous driving vehicle 2.

When the determination unit 46 determines that the autonomous driving vehicle 2 reaches the illuminance suppression point, the lighting device controller 47 turns off a part or all of front lighting devices 25 of the autonomous driving vehicle 2 as the illuminance suppression. For example, the lighting device controller 47 turns off a part of the front lighting devices 25 by turning off the headlights while maintaining the turning-on of the small lights. A part of the fog lamps may be turned off. The lighting device controller 47 turns off all of the front lighting devices 25 by turning off the front lighting devices including the small lights and the headlights.

[Processing Method of Automated Valet Parking System (Automated Valet Parking Server)]

Next, a processing method of the automated valet parking system 1 according to the present embodiment will be described with reference to the drawings. FIG. 9A is a flowchart illustrating an example of illuminance suppression point setting processing. The illuminance suppression point setting processing is performed, for example, with the execution of automated valet parking.

As illustrated in FIG. 9A, the automated valet parking server 10 of the automated valet parking system 1 acquires the illuminance information of the front lighting devices 25 of the autonomous driving vehicle 2 by the illuminance information acquisition unit 12 in S10. The illuminance information acquisition unit 12 acquires the illuminance information of the front lighting devices of the autonomous driving vehicle 2 by, for example, capturing an image of the front lighting devices that is turned on by the parking place camera. Alternatively, the illuminance information acquisition unit 12 acquires the illuminance information from the image information captured by the front camera of the autonomous driving vehicle 2 while the front lighting devices of the autonomous driving vehicle 2 is turned on.

In S12, the automated valet parking server 10 sets the illuminance suppression point by the illuminance suppression point setting unit 13. The illuminance suppression point setting unit 13 sets the illuminance suppression point based on the parking place map information and the parking place lighting information of the parking place map database 5 and the illuminance information of the front lighting devices of the autonomous driving vehicle 2 acquired by the illuminance information acquisition unit 12. The illuminance suppression point setting unit 13 may further set the illuminance suppression point in consideration of the current time.

In S13, the automated valet parking server 10 gives an illuminance suppression instruction by the illuminance suppression instruction unit 14. The illuminance suppression instruction unit 14 gives, for example, an instruction about the illuminance suppression point to the autonomous driving vehicle 2 in advance. The autonomous driving vehicle 2 performs the illuminance suppression when it is determined that the autonomous driving vehicle reaches the illuminance suppression point. Thereafter, the automated valet parking server 10 ends the current illuminance suppression point setting processing.

The automated valet parking server 10 may update the illuminance suppression point at regular time intervals or at a predetermined time when the influence of the light from the outside changes with the passage of time.

Figure 9B:
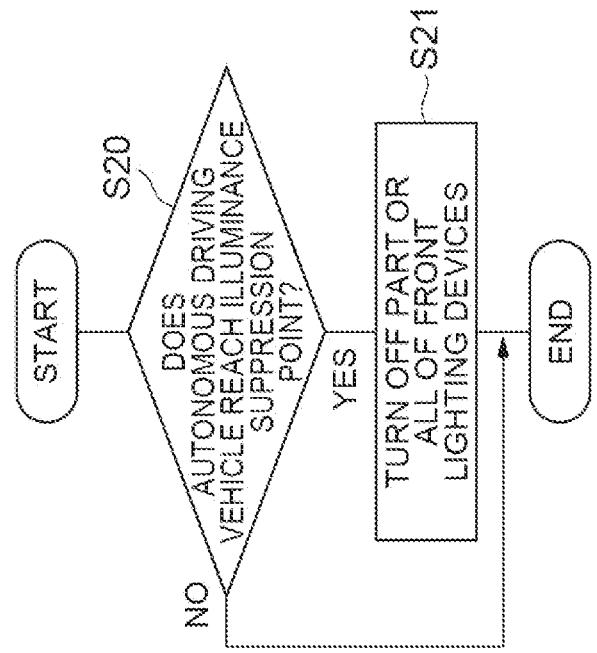
FIG. 9B is a flowchart illustrating an example of the illuminance suppression processing in the autonomous driving vehicle.
Figure 9A:
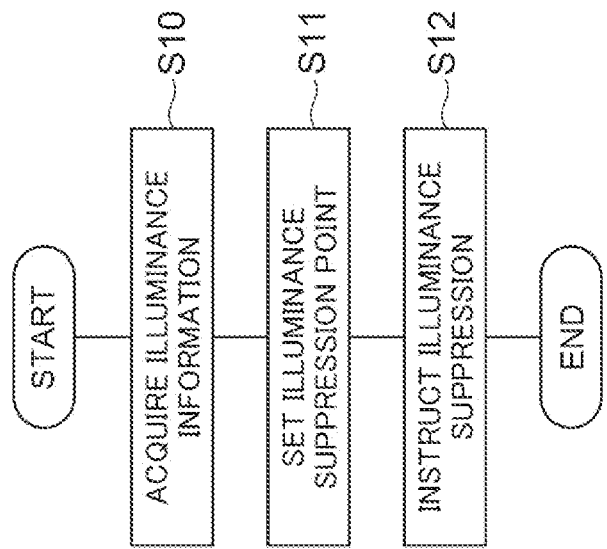
FIG. 9A is a flowchart illustrating an example of illuminance suppression point setting processing.

FIG. 9B is a flowchart illustrating an example of the illuminance suppression processing in the autonomous driving vehicle 2. When the illuminance suppression instruction (or the parking plan including the illuminance suppression instruction) is received from the automated valet parking server 10, the autonomous driving ECU 20 of the autonomous driving vehicle 2 starts the illuminance suppression processing.

As illustrated in FIG. 9B, in S20, the autonomous driving ECU 20 determines whether or not the autonomous driving vehicle 2 reaches the illuminance suppression point by the determination unit 46. The determination unit 46 performs the above determination based on the host vehicle position recognized by the host vehicle position recognition unit 43 and the illuminance suppression point instructed by the automated valet parking server 10. When it is determined that the autonomous driving vehicle 2 reaches the illuminance suppression point (S20: YES), the automated valet parking server 10 proceeds to S21. When it is not determined that the autonomous driving vehicle 2 reaches the illuminance suppression point (S20: NO), the automated valet parking server 10 ends the current illuminance suppression processing. Thereafter, the autonomous driving ECU 20 repeats the processing of S20 again after a predetermined time has elapsed.

In S21, the autonomous driving ECU 20 turns off a part or all of the front lighting devices 25 of the autonomous driving vehicle 2 as the illuminance suppression by the lighting device controller 47. For example, the lighting device controller 47 turns off a part of the front lighting devices 25 by turning off the headlights while maintaining the turning-on of the small lights. Thereafter, the autonomous driving ECU 20 ends the current illuminance suppression processing. The autonomous driving ECU 20 repeats the illuminance suppression processing during the execution of automated valet parking.

Although the embodiment of the present disclosure has been described above, the present disclosure is not limited to the above-described embodiment. The present disclosure can be implemented in various forms including various modifications and improvements based on the knowledge of those skilled in the art, including the above-described embodiment.

The automated valet parking system 1 may include not only the automated valet parking server 10 but also the autonomous driving vehicle 2. A part of the function of the automated valet parking server 10 may be performed by the autonomous driving ECU 20 of the autonomous driving vehicle 2.

When only the illuminance of the front lighting devices of the autonomous driving vehicle 2 exceeds the total illuminance threshold value, the illuminance suppression point setting unit 13 may set the illuminance suppression point at the position corresponding to the landmark outside the illumination range of the lighting equipment of the parking place.

The autonomous driving vehicle 2 may not have the determination unit 46. The autonomous driving vehicle 2 may perform the illuminance suppression when the illuminance suppression instruction is received from the automated valet parking server 10.

What is claimed is:

1. An automated valet parking server that causes an autonomous driving vehicle in a parking place to perform automated valet parking by instructing the autonomous driving vehicle, the automated valet parking server comprising a processor and a storage unit storing non-transitory computer executable instructions executable by the processor to implement:
   an illuminance information acquisition unit configured to acquire illuminance information of front lighting devices of the autonomous driving vehicle;
   an illuminance suppression point setting unit configured to set an illuminance suppression point which is a position in the parking place at which illuminance of the front lighting devices of the autonomous driving vehicle is suppressed based on parking place map information of the parking place and the illuminance information of the front lighting devices of the autonomous driving vehicle; and
   an illuminance suppression instruction unit configured to instruct the autonomous driving vehicle to perform illuminance suppression at the illuminance suppression point.

2. The automated valet parking server according to claim 1, wherein the illuminance suppression point setting unit is configured to set the illuminance suppression point at a position corresponding to a landmark for host vehicle position estimation of the autonomous driving vehicle, which is provided in the parking place, based on the parking place map information, the illuminance information of the front lighting devices of the autonomous driving vehicle, and parking place lighting information associated with the parking place map information.

3. The automated valet parking server according to claim 2,
   wherein the parking place lighting information includes information on illuminance in the parking place corresponding to a time zone, and the illuminance suppression point setting unit is configured to set the illuminance suppression point based on information on illuminance in the parking place corresponding to a current time.

4. The automated valet parking server according to claim 1, wherein the illuminance information acquisition unit is configured to acquire the illuminance information by measuring the illuminance of the front lighting devices of the autonomous driving vehicle by an illuminance measurement device provided in the parking place.

5. The automated valet parking server according to claim 2, wherein the illuminance information acquisition unit is configured to acquire the illuminance information by measuring the illuminance of the front lighting devices of the autonomous driving vehicle by an illuminance measurement device provided in the parking place.

6. The automated valet parking server according to claim 1, wherein the illuminance information acquisition unit is configured to acquire the illuminance information from image information captured by a front camera of the autonomous driving vehicle when the front lighting devices of the autonomous driving vehicle are turned on.

7. The automated valet parking server according to claim 2, wherein the illuminance information acquisition unit is configured to acquire the illuminance information from image information captured by a front camera of the autonomous driving vehicle when the front lighting devices of the autonomous driving vehicle are turned on.

8. An automated valet parking system that causes an autonomous driving vehicle in a parking place to perform automated valet parking by instructing the autonomous driving vehicle, the automated valet parking system comprising a processor and a storage unit storing non-transitory computer executing instructions executable by the processor to implement:
   an illuminance information acquisition unit configured to acquire illuminance information of front lighting devices of the autonomous driving vehicle;
   an illuminance suppression point setting unit configured to set an illuminance suppression point which is a position in the parking place at which illuminance of the front lighting devices of the autonomous driving vehicle is suppressed based on parking place map information of the parking place and the illuminance information of the front lighting devices of the autonomous driving vehicle; and
   an illuminance suppression instruction unit configured to instruct the autonomous driving vehicle to perform illuminance suppression at the illuminance suppression point.

* * * * *